G. E. F. TRIBES.
METHOD FOR DRYING, BAKING, ROASTING, AND COOLING ORGANIC SUBSTANCES.
APPLICATION FILED JAN. 21, 1920.
1,403,211. Patented Jan. 10, 1922.
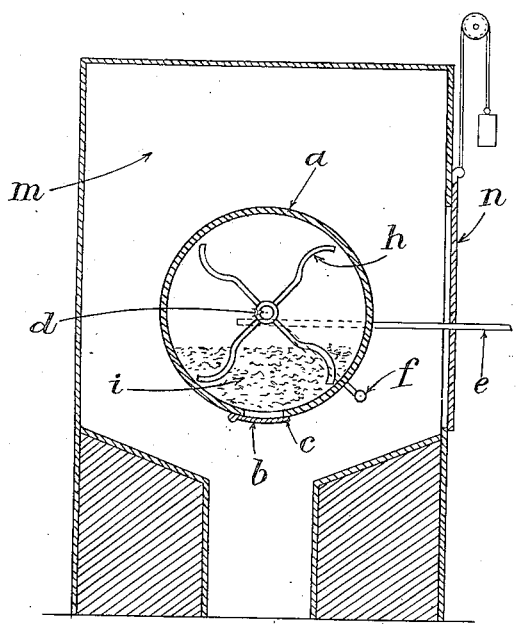
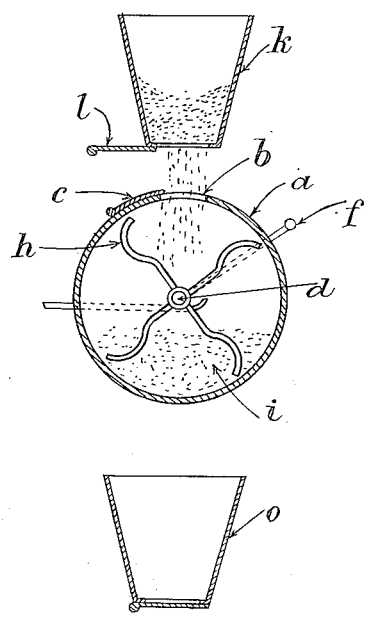
INVENTOR:
Gaston Edouard François Tribes
By Otto Munk
his ATTORNEY.

UNITED STATES PATENT OFFICE.

GASTON EDOUARD FRANÇOIS TRIBES, OF PARIS, FRANCE, ASSIGNOR TO SOCIETE ANONYME "PROCEDES TORRIDA," OF BRUSSELS, BELGIUM.

METHOD FOR DRYING, BAKING, ROASTING, AND COOLING ORGANIC SUBSTANCES.

1,403,211.   Specification of Letters Patent.   Patented Jan. 10, 1922.

Application filed January 21, 1920. Serial No. 353,123.

*To all whom it may concern:*

Be it known that I, GASTON EDOUARD FRANÇOIS TRIBES, citizen of the Republic of France, residing at 236 Faubourg St. Honoré, Paris, in the Republic of France, have invented new and useful Improvements in Methods for Drying, Baking, Roasting, and Cooling Organic Substances, of which the following is a specification.

This invention has for its object an improved method for heating organic materials which have to be dried, cooked, or roasted. According to the invention, said materials are brought into contact with a refractory material in a comminuted state, which is held in movement, said refractory material being heated gradually to a high temperature. The improved method may be applied to any kind of organic materials, vegetable or animal (grain, roots, fruit, chicory, coffee, sugar, meat, vegetables, tubercles, cryptogams, wood, etc.).

The invention consists also in a method for cooling the organic materials heated as above which method consists in incorporating into the heated mixture above referred to a cold refractory material in a finely comminuted state and held also in movement whereby the temperature of the mixture is lowered gradually in the absence of air.

By refractory material should be understood any material which is capable of storing a considerable amount of heat without being itself subjected to an inflammation or combustion and is capable of conveying said heat to the materials with which it has been mixed, for the purpose of drying, baking or roasting the same.

The refractory material inside which the organic products to be treated are retained is finely divided and held in movement whereby the organic products are surrounded on their whole surface with a moderate and continuously acting heat, the refractory material having for its effect to coat or surround the products to be treated by a kind of movable air excluding network by means of which the vapors given off by the material treated are constantly brought again onto the same. It will thus be seen that three characteristic features of the invention are the following: a refractory material is used for conveying the heat; said material is in a divided state so as to surround the whole surface of the products to be treated and finally, said refractory material is in movement whereby the vapors given off are con- are concentrated onto the products and the evaporation is checked.

The above method has important advantages: it allows of drying, baking or roasting organic materials with the minimum loss in weight; the drying, baking or roasting operations are rendered progressive and any desired degree of action may be obtained, and also the combustion of the organic material or its disintegration by too intense a heat such as occurs in ordinary methods, particularly when the material is in contact with an over-heated metal plate, is avoided, so that no carbonization product can become mixed with the essences in the product treated which it may be desired to keep in a pure state. Moreover, the volatilization of the essences is checked, whereby the aroma, taste and quality of the material treated are substantially improved. It will thus be seen that the improved method results in a better product and an economical operation.

The invention consists also in cooling the materials treated as above by an air excluding and coating method similar to that above described. Said method consists, when the heated mixture of organic products and refractory material has been removed from the source of heat, in adding thereto a cold refractory material which is in a divided state and held in movement as the hot refractory material above mentioned. This cold refractory material, by being progressively introduced into the mass of the moving mixture, will cause a gradual lowering in the temperature of the same.

The above method for obtaining a progressive cooling of the material treated has also distinct advantages. It permits the improved results obtained by the heating method above described, which could be spoiled by a lengthened action of an intense heat, to be definitely secured; in addition thereto, it has the main advantage to prevent an increase in the temperature of the product treated and the combustion which might result herefrom owing to a sudden contact with the outer air.

By way of example, coffee or corn may be quite satisfactorily roasted by operating as follows: Green coffee is first mixed with sand in such manner as to be wrapped in the latter, both materials being at the normal temperature. The mixture is then heated and held in movement during the whole roasting operation. The time needed for such operation is previously fixed by experiments. When the coffee berries are known to be conveniently roasted, said mixture is taken away from the heating apparatus and is then cooled at the proper speed by adding it with fresh cold sand in convenient proportions, the whole being held in movement. When the cooling operation is terminated, the berries are then separated from the sand by any usual process, for instance by straining the mixture on a sieve upon which said berries only are stopped.

The annexed drawing shows by way of example an embodiment of an apparatus for carrying out the exposed method. In this drawing: Figure 1 is a sectional elevation of an oven having disposed therein the apparatus proper in which the heating operation is effected; Fig. 2 shows the same apparatus in its position for being filled with material, or emptied.

As shown in the drawing, the apparatus is composed of a hollow metallic sphere $a$ provided with an aperture $b$ closed by a slidable cover $c$. The said sphere is supported by a shaft $d$ adapted to roll on guiding rails $e$ disposed on both sides of the apparatus. The shaft $d$ and consequently the sphere $a$ are set in rotation by means of a handle $f$. On a fixed cylinder $g$ disposed around the sphere $d$ are disposed stirring arms $h$ provided for waving the mixture $i$ of substance and refractory material contained in the sphere $a$. To start the operation the sphere is brought in the position shown in Figure 2 by rolling it on the rails $e$. The mixture ready prepared in such quantity as to fill about half the sphere $a$ and contained in the feeding box $k$ is dropped into the sphere $a$ by opening both obturators $c$ and $l$.

The sphere is then closed and introduced into the heated oven $m$ by rolling it on the rails, the shaft $d$ having a sufficient length for permitting the handle $f$ to remain outside. The door $n$ of the oven is then closed and the sphere continuously held in rotation until the heating operation is effected. The sphere is then brought back to its first position and a convenient amount of cold refractory material previously disposed in the feeding box $k$ is dropped into the sphere $a$. The sphere $a$ is thereafter continuously rotated and once the wanted cooling degree is attained, the cover $c$ is opened and the sphere emptied into the receiving box $o$.

Having now described my invention, what I claim as new and desire to secure by Letters Patent is

1. A method for heating an organic substance which consists in mixing with said cold substance a cold refractory material in a comminuted state so that the whole surface of the organic substance is covered with an air excluding coating, imparting a stirring movement to the mixture and heating progressively the same to a high temperature.

2. A method for cooling a heated organic substance which consists in mixing with said substance a cold refractory material in a comminuted state so that the whole surface of the organic substance is covered with an air excluding coating and imparting a stirring movement to the mixture.

In testimony whereof I have signed my name to this specification.

GASTON EDOUARD FRANÇOIS TRIBES.